United States Patent
Drabenko et al.

[11] 3,886,448
[45] May 27, 1975

[54] METHOD AND APPARATUS FOR TESTING HIGH-VOLTAGE DIVIDERS

[76] Inventors: Ivan Fedorovich Drabenko, ulitsa Dimo 9/3, kv. 41; Ivan Yakovlevich Daniljuk, ulitsa Tolbukhina, 2, kv. 46, both of Kishinev, U.S.S.R.

[22] Filed: Nov. 5, 1973

[21] Appl. No.: 412,721

[52] U.S. Cl. ............................ 324/63; 324/DIG. 1
[51] Int. Cl. ............................................ G01r 27/02
[58] Field of Search ..................... 324/63, DIG. 1

[56] References Cited
UNITED STATES PATENTS

| | | | |
|---|---|---|---|
| 2,803,799 | 8/1957 | Siegel et al. | 324/63 |
| 3,270,275 | 8/1966 | Latham, Jr. | 324/63 X |
| 3,324,390 | 6/1967 | O'Leary et al. | 324/63 |
| 3,377,555 | 4/1968 | Lewis | 324/63 |
| 3,403,336 | 9/1968 | Coor et al. | 324/63 |
| 3,423,680 | 1/1969 | Julie | 324/63 X |

*Primary Examiner*—Stanley T. Krawczewicz

[57] ABSTRACT

Method of and apparatus for testing high-voltage dividers under actual working conditions, based upon a comparison of the conversion ratio of the dividers, under operating conditions, with the conversion ratio of a low-voltage reference voltage divider. An additional or auxilliary high-voltage divider is connected in parallel with the divider being tested, and the reference voltage divider is inserted in the circuit of the additional divider. In one position of a selector switch the reference divider is short-circuited and a null indicator is connected between the outputs of the divider being tested and the additional divider, while in the second position of the switch a recording device is connected between the outputs of the divider being tested and the reference divider.

2 Claims, 1 Drawing Figure

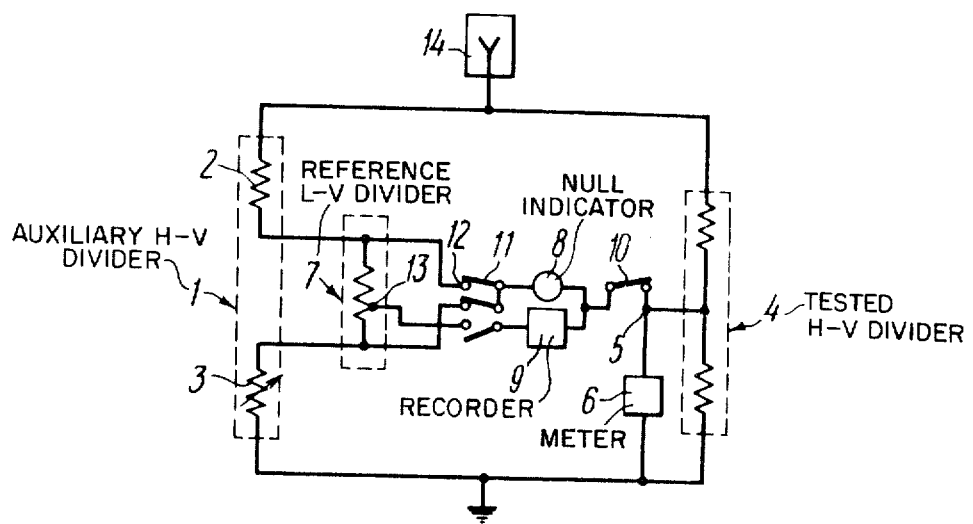

METHOD AND APPARATUS FOR TESTING HIGH-VOLTAGE DIVIDERS

The invention relates to high-voltage measuring techniques, and more particularly to a method of and apparatus for testing high-voltage dividers, for use mainly in metrology, instrumentation engineering and power generation.

A known method of testing a high-voltage divider is based upon the determination of its conversion ratio by using a reference low-voltage divider.

The testing by this method comprises the step of determining, through the use of a decadic precision decade low-voltage divider, a plurality of ratios between the resistances of the divider being tested, with a subsequent calculation of the basic conversion ratio of the tested divider from the conversion ratio values obtained for the decade divider.

The above-described method is applicable only to specially designed dividers having at least two outputs. The testing of the divider in the course of its operation, under actual working conditions, is not possible. The test is conducted under conditions different from the operating conditions, since the electrical and thermal performance of the divider is changed due to a short-circuit of one of the arms thereof. A large number of switching-over and measuring steps result in low accuracy and longer test time.

Known in the art is also an apparatus embodying the above method of testing a high-voltage divider, comprising a reference low-voltage divider electrically coupled to the divider being tested, and a null indicator having one of its inputs connected to the output of the tested divider.

This apparatus comprises a series test circuit consisting of a high-voltage resistor and a reference decade low-voltage divider connected in parallel with the divider being tested. The apparatus also comprises a null indicator having one of its inputs connected to the output of the reference voltage divider, and a plurality of selector switches. The latter are used to connect a second input of the null indicator to the output of the divider being tested, as well as to short-circuit the arms thereof.

This apparatus has not found wide use since it is applicable only for testing dividers having two outputs and a certain ratio between the resistances of its arms. In addition, a costly decade voltage divider of the 0.0001 accuracy class is required for such an apparatus, which is very difficult to manufacture.

It is therefore an object of the present invention to provide a method an apparatus for testing high-voltage dividers at full voltages, applicable to dividers of any type and design, in the course of their operation, without disturbing the electrical and thermal performance, and to ensure high accuracy and speed of the testing.

This object is accomplished in the inventive method in basing it upon the determination of the conversion ratio of the divider, namely by using a low-voltage reference divider. The conversion ratio of the divider being tested is determined by means of the reference divider by comparing the conversion ratio of the tested divider, under actual operating conditions, with that of the reference divider, the conversion ratio of the latter being selected to be equal to the rated value of that of the tested divider. An additional high-voltage divider is connected in parallel with the tested divider and adjusted to a conversion ratio equal to that of the other divider, with a subsequent insertion of the reference divider in the additional divider circuit, and measurement of a potential difference between the outputs of the tested and the reference dividers, the conversion ratio of the tested divider being calculated from the potential difference.

The object is also accomplished by the inventive apparatus which comprises the low-voltage reference divider, electrically coupled to the divider being tested, and an output of the tested divider. The additional high-voltage divider has a variable output according to the invention, variable output additional and is connected in parallel with the tested divider. The reference divider is inserted in the circuit of the additional divider. The apparatus further comprises a recording device having one input connected to the output of the tested divider, and a selector switch so connected that in one position the reference divider is short-circuited and a second input of the null indicator is connected to an output of the additional divider, while in a second position of the switch a second input of the recording device is connected to an outut of the reference voltage divider.

The inventive method and apparatus for testing a high-voltage permit rapid and accurate testing of precision high-voltage dividers and render the operations simpler and less costly. Evidently the manufacture of a reference voltage divider with one or more conversion ratio values does not present any difficulty, while the reference divider as an independently tested apparatus allows to perform the entire testing operation without using any high-precision devices or standard instruments.

The invention will now be described in greater detail with reference to a preferred embodiment thereof in conjunction with the accompanying drawing, the sole FIGURE of which is a circuit diagram of an exemplary apparatus for carrying out the method of testing high-voltage dividers, according to the invention.

By testing under operating conditions is meant such testing in which the operating voltage proper is applied to the input of the divider being tested, and the output voltage of the divider is measured (or recorded) by an instrument of any appropriate type, the operations performed during the testing having no effect at all on the performance of the divider being tested.

The apparatus according to the invention for testing high-voltage dividers comprises an additional auxiliary high-voltage divider 1 having a high-voltage resistor arm 2 with a resistance $R_1$, and a low-voltage resistor arm 3 with a variable resistance $R_2$, connected in parallel with a high-voltage divider 4 to be tested, a meter 6 being connected to an output 5 of this divider. Connection to the divider 4 is made between an input 14 and a second terminal point designated as ground, which is common to the auxiliary divider 1 (and to one terminal of the meter 6). A low-voltage reference divider 7 with an impedance $R_3$ is connected between the arms 2 and 3 of the divider 1.

The apparatus also comprises a null indicator 8 and a recording device 9 which have a common input connected via a switch 10 to the output 5 of the divider 4, as well as a selector switch 11 which is so arranged that in one position thereof (shown in the drawing) the divider 7 is short-circuited and a second input of the null indicator 8 is connected to an output 12 of the divider 1. In the second position of the selector switch 11, a second output of the recording device 9 is connected to an output 13 of the divider 7.

In this arrangement, the divider 7 is selected to have a conversion ratio equal to the rated conversion ratio of the divider 4, while the ratio between the values $R_1$ and $R_3$ (of the arm 3 in auxiliary divider 1 and the reference divider 7) is selected such that after the application of the operating or working voltage to the high-voltage input of the tested divider 4 at the second position of the selector switch 11 the divider 7 is also energized with its own operating or working voltage.

The method of testing the high-voltage divider 4 is carried out in the following sequence. The conversion ratio which is equal to that of the divider 4 being tested is set in the divider 1. For this purpose, the operating voltage $U_1$ of the divider 4 under test is applied between the input 14 and ground. Then the resistance $R_2$ in arm 3 is adjusted, the selector switch 11 and switch 10 being set to the positions shown in the drawing, so as to obtain zero reading on the null indicator 8. In this case, the following conditions are satisfied:

$$S = \frac{U_2}{U_1} = \frac{R_2}{R_1 + R_2} \quad (1)$$

wherein $S$ is the conversion ratio of the divider 4, and
$U_2$ is the output voltage of the divider 4 as measured by the meter 6.

The null indicator 8 should have a negligibly small error due to its dead band.

It should be noted that eqn. (1) includes the actual value of the conversion ratio of the divider 7 which is established after the application of the high voltage and takes into account the shunting influence of the meter 6.

Then the potential difference is measured between the outputs 13 and 5 of the dividers 7 and 4, respectively. For that purpose, the selector switch 11 is set to the second position, and the value of $\Delta U_2$ is read on the recording device 9, the sensitivity of this device being selected depending upon the required accuracy of testing.

Then, one can write:

$$U_2 = \frac{R_2 + S_o \cdot R_3}{R_1 + R_2 + R_3} U_1 + \Delta U_2 \quad (2)$$

By solving together eqns. (1) and (2), the desired conversion ratio of the divider 4 is found as follows:

$$S = S_o \left[ 1 + \left( 1 + \frac{R_2}{R_3} \cdot \frac{1}{S_o} \right) \cdot \frac{\Delta U_2}{U_2 - \Delta U_2} \right] \quad (3)$$

As is known, the actual value of the conversion ratio is expressed by the formula:

$$S = S_n (1 + \delta) \quad (4)$$

wherein $\delta$ is the relative error.
Or, taking into account that in this case $S_n = S_o$:

$$S = S_o (1 + \delta) \quad (5)$$

from eqns. (5) and (3) one finds that:

$$\delta = \left( 1 + \frac{R_2}{R_3} \cdot S_o^{-1} \right) \cdot \frac{\Delta U_2}{U_2 - \Delta U_2} \quad (6)$$

It will be apparent from eqn. (6) that an accurate determination of "$\delta$" is possible with the values $R_2$, $R_3$ and $U_2$ being measured even to a low degree of accuracy, and in testing the precision voltage dividers their rated values $R_{2n}$, $R_{3n}$, $U_{2n}$ can substitute them for the above values in almost all cases.

Apart from the above-described apparatus incorporating active-type dividers, similar apparatus may be designed using capacitive, capacitive-and-ohmic and inductive voltage dividers.

The method and apparatus for testing high-voltage dividers according to the invention are highly promising for testing a large variety of dividers of different types designed for voltages from several kilovolts up to hundreds of kilovolts, both for alternating and direct current. On the basis of this invention, independently tested twin dividers have been designed for a voltage from 10 to 1,000 kV with an error of only 0.001 to 0.1% which are widely used in such fields as metrology, nuclear physics, instrumentation engineering and power production.

What is claimed is:

1. A method of testing a high-voltage divider, for example for several hundreds kilovolts, under actual high-voltage working conditions, comprising the steps of comparing the conversion ratio of the divider being tested under actual operating conditions with the conversion ratio of a low-voltage reference voltage divider which is selected to be equal to the rated value of that of the tested divider; connecting an additional voltage divider in parallel with the tested divider and adjusting the conversion ratio of the additional divider to be equal to that of the tested divider; operating both the tested divider and the reference divider under their own working voltages, that across the latter being lower by several orders than that across the former; inserting the reference divider in the circuit of the additional divider; then measuring a potential difference between the outputs of the tested divider and the reference divider; and calculating the conversion ratio of the tested divider from the potential difference.

2. An apparatus for testing a high-voltage divider under actual working conditions, comprising: a low-voltage reference divider having an output; a null indicator having two outputs, one of them connected to the output of the divider being tested; a variable-output additional high-voltage divider connected in parallel with the tested divider and having an output, said reference divider being inserted in the circuit of said additional divider; a recording device having two inputs, one of them connected to the output of the tested divider; a selector switch arranged so that in one position thereof said reference divider is short-circuited and the second input of said null indicator is connected to said output of the additional divider, while in a second position of said switch the second input of said recording device is connected to said output of the reference divider; and a high-voltage lead-in.

\* \* \* \* \*